United States Patent [19]

Jones et al.

[11] 4,012,574

[45] Mar. 15, 1977

[54] POLYMERIZATION PROCESS

[75] Inventors: Eric Jones; John Walker, both of Runcorn, England

[73] Assignee: Imperial Chemical Industries Limited, London, England

[22] Filed: Jan. 13, 1975

[21] Appl. No.: 540,702

[30] Foreign Application Priority Data

Jan. 14, 1974 United Kingdom ............... 1615/74

[52] U.S. Cl. .................................. 526/74; 526/140; 526/143; 526/154; 526/350; 526/352

[51] Int. Cl.² ...................... C08F 4/02; C08F 10/02

[58] Field of Search ............. 260/94.9 C, 94.9 DA, 260/93.7, 88.2 R; 450/632, 662.5; 526/74, 143

[56] References Cited

UNITED STATES PATENTS

| | | | |
|---|---|---|---|
| 2,970,989 | 2/1961 | Hoxie | 260/94.9 C |
| 3,082,198 | 3/1963 | Klein | 260/94.9 C |
| 3,159,615 | 12/1964 | Weeks et al. | 260/94.9 C |
| 3,497,488 | 2/1970 | Dawans et al. | 260/94.9 C |
| 3,644,564 | 2/1972 | Zwet et al. | 260/94.9 C |
| 3,840,508 | 10/1974 | Ballard et al. | 260/94.9 DA |

FOREIGN PATENTS OR APPLICATIONS

| | | |
|---|---|---|
| 2,302,962 | 7/1973 | Germany |
| 884,116 | 12/1961 | United Kingdom |
| 1,067,068 | 5/1967 | United Kingdom |

*Primary Examiner*—Edward J. Smith
*Attorney, Agent, or Firm*—Cushman, Darby & Cushman

[57] ABSTRACT

Process for the dispersion polymerization or copolymerization of olefins, especially ethylene alone or with an α-olefin, which is conducted in the presence of a surface-active compound containing one or more perfluorocarbon groups and, optionally, one or more hydrophilic groups, to reduce fouling of the reactor with adherent polymer particles. Particularly effective when olefins are polymerized with supported transition metal hydrocarbyl catalysts in non-polar hydrocarbon diluents.

7 Claims, No Drawings

POLYMERIZATION PROCESS

This invention relates to the polymerisation or copolymerisation of one or more olefinically unsaturated monomers, particularly the homopolymerisation of ethylene or the copolymerisation of ethylene with one or more α-olefins by dispersion polymerisation, in which solid particles of polymer are produced as a dispersion in a non-polar liquid hydrocarbon medium.

Problems are frequently caused in such processes, particularly where the liquid medium is a saturated aliphatic hydrocarbon, by particles of the product polymer sticking to internal surfaces of the polymerisation apparatus, for example the walls of the reactor vessel, stirrer paddles, etc. instead of forming a smooth dispersion in the liquid medium. This effect is thought to be due, at least in part, to the generation of electrical charges upon the polymer particles, and this is in agreement with the observation that the effect is more serious in a medium of low dielectric constant, for example hexane, than in one of higher dielectric constant, for example toluene.

We have now found that the problem may be overcome by the addition of small quantities of certain surface-active agents containing at least one terminal perfluorocarbon group.

According to the present invention, therefore, we provide a process for the polymerisation or copolymerisation of olefins by dispersion polymerisation of the said olefin or olefins in a non-polar liquid hydrocarbon diluent in the presence of a polymerisation catalyst and in the presence of a surface-active compound containing one or more terminal aliphatic perfluorocarbon groups containing at least three carbon atoms.

Olefins which may be polymerised according to the present invention include ethylene, propylene, butene-1, 4-methylpentene-1, 1,3-butadiene, 1-hexene or mixtures of these. The process is especially suitable for the polymerisation of ethylene to high density polyethylene or for the copolymerisation of ethylene with one or more α-olefins, especially propene, butene-1, hexene-1 or octene-1. Suitable non-polar hydrocarbon diluents include pentane, hexane, heptane, octane and hydrocarbon fractions containing mixtures of these. Cyclohexane and aromatic hydrocarbons, for example benzene and toluene, may also be used.

Polymerisations according to our process may be carried out at temperatures between 0° and 120° C, particularly 50°-110° C, and pressures of from 1 to 500 atmospheres, preferably 1-200 atmospheres. Preferably the process is operated in the absence of oxygen and water, and preferably in the presence of hydrogen as a chain transfer agent. Either a continuous or a batchwise process may be employed.

Although the process of our invention may be employed with a variety of catalyst systems, its advantages are most marked when olefins are polymerised or copolymerised using supported transition metal hydrocarbyl catalyst systems. One such system is that described in our British Pat. No. 1,314,828, which describes and claims a process for the polymerisation or copolymerisation of olefinically unsaturated monomers in which the monomer is contacted with a catalyst which comprises a transition metal composition which is the product of reacting a transition metal complex of the general formula $$R_mMX_p$$

with a substantially inert matric material have a hydroxylic surface which is free from adsorbed water, wherein M is a transition metal of Groups IVA to VIA of the Periodic Table of the Elements, preferably Group IVA, R is a hydrocarbon group or substituted hydrocarbon group, X is a monovalent ligand, and $m$ and $p$ are integers, $m$ having a value from 2 to the highest valency of the metal M and $p$ having a value of from 0, to 2 less than the prevailing valency of the metal M in the complex. Novel transition metal compositions employed in this process are also claimed.

(All references to the Periodic Table are to that version of the Periodic Table of the Elements printed inside the back cover of "Advanced Inorganic Chemistry" by F A Cotton and G Wilkinson, 2nd Edition, Interscience Publishers, 1966).

In this context, the matrix "having surface" is used to denote a plurality of —OH groups attached to the surface of the matrix material, the hydrogen atom of the —OH group being capable of acting as a proton source, that is, having an acidic function. Such a material will be "substantially inert" in that, whereas the said —OH groups are capable of reacting with, to the transition metal hydrocarbyl complex, the bulk of the matrix material is chemically inert. Particularly good examples of such matrix materials are silica and alumina or mixtures thereof. These comprise a matrix of silicon or aluminium and oxygen atoms, to the surface of which —OH groups are attached, the hydrogen atoms of said groups having an acidic function, However, apart from the presence of these —OH groups, silica and alumina are generally regarded as chemically inert.

As previously mentioned, the process of our invention gives most advantageous results when used with supported transition metal hydrocarbyl compound catalysts. However their use may also be advantageous with the so-called Phillips catalysts (chromium oxide doped inert substrates), Ziegler, modified Ziegler or supported Ziegler catalyst systems.

Preferably, the surface-active agent added to the reaction medium comprises a compound containing a hydrophilic group and a terminal aliphatic perfluorocarbon group containing at least three carbon atoms.

The perfluorocarbon group containing at least three carbon atoms may be either the whole or part only of the fluorocarbon portion of the molecule and groups containing hydrogen atoms intervene between the terminal perfluorocarbon group and the hydrophilic parts of the molecule. Thus the perfluorocarbon group may be a branched or a straight chain perfluoroalkyl or perfluoroalkenyl group, or may be part of a highly fluorinated branched or straight chain group which may be saturated or unsaturated.

The terminal aliphatic perfluorocarbon group of at least three carbon atoms may be a perfluoro-iso-propyl or perfluorotertiary-butyl group, but it is preferably a straight perfluoroalkyl chain $CF_3(CF_2)_n-$ or a branched perfluoroalkenyl or perfluoroalkyl group of which the following are preferred examples:

$(CF_3)_2CF(CF_2)_n-$
$C_2F_5-C(CF_3)=C(C_2F_5)CF_2-$
$(C_2F_5)_2C(CF_3)-C(CF_3)=C(CF_3)-$
$C_2F_5-C(CF_3)=C(CF_3)-CF_2-CF_2-$
$(C_2F_5)_2-C(CF_3)-CH_2-$ $(C_2F_5)_2-C(CF_3)-CH=C(CF_3)-$

The hydrophilic group may be ionic or non-ionic and in the case of ionic groups, which in general will consist of anion-cation pairs, either or both ions may be attached covalently to the fluorocarbon part of the molecule. The hydrophilic group preferably is an oxyalkylene chain containing oxygen:carbon ratios greater than 0.3.

The surface-active agent may, if desired, contain more than one hydrophilic group, and these may be anionic, cationic, amphoteric or non-ionic in nature and may be of the same or different types. There may also be more than one terminal perfluorocarbon group of at least three carbon atoms; for example two such groups may be joined by an oxyalkylene chain.

Strong acid groups are undesirable in the surface-active agents, as these may react with and deactivate the catalyst. However, aromatic carboxylic acid groups have been found to be compatible with some catalysts, especially those of the type described in British Pat. No. 1,314,828.

Examples of suitable surface active agents include the following types:

| | |
|---|---|
| $R_f(CH_2)_mCOOH$ | I |
| $R_fO(CH_2CH_2O)_xR$ | II |
| $R_fO(CH_2CH_2O)_xR_f$ | III |
| $R_fOC_6H_4CH_2O(CH_2CH_2O)_xR$ | IV |
| $R_fOC_6H_4CH_2O(CH_2CH_2O)_xR_f$ | V |
| $R_f(CH_2CH_2O)_xR$ | VI |
| $R_fOC_6H_4SO_2O(CH_2CH_2O)_xSO_2C_6H_4OR_f$ | VII |
| $R_fC_6H_4SO_2O(CH_2CH_2O)_xR$ | VIII |
| $R_fOC_6H_4COOH$ | IX |
| $R_fOC_6H_4R$ | X |

In which R is hydrogen or an alkyl group; $R_f$ is $C_nF_{2n+1}$ or $C_nF_{2n-1}$ where $n$ is 6, 8, 10 or 12 for example $C_{10}F_{19}$, $C_8F_{15}$, $C_8F_{17}$, $C_8F_{13}$ and $C_{12}F_{23}$; $x$ is an integer from 1 to 100, preferably 5 to 40 and $m$ is an integer from 0 to 6.

The $R_f$ groups in the above formulae may be straight chain or branched chain and are preferably derived from oligomers of tetrafluoroethylene, i.e. $(C_2F_4)_n$ where $n = 3, 4, 5$ or 6. Preferred surface active agents are those having structures II and III above, and particularly where $R_f = C_{10}F_{19}$ and $x$ is from 5 to 40.

The surface-active agent may be added to the polymerisation reaction medium in one lot before the start of the reaction, or may be added during the reaction as a solution in the hydrocarbon diluent. Where the catalyst is added during the reaction as a solution, suspension or slurry in the hydrocarbon diluent, the surface active agent it may be convenient to add it as a component of the catalyst mixture. Where the diluent is a saturated aliphatic hydrocarbon for example hexane, certain surface active agents particularly of types II-VIII above where x >40 may be insufficiently soluble in the diluent, in which case they may be added as a solution in a more polar hydrocarbon solvent, for example toluene, or in a mixture of solvents for example hexane/toluene.

The concentration of surface active agent to be maintained in the reaction medium is suitably 0.05–25 parts per million, preferably 0.1–10 ppm. The relative efficiency of surface-active agents in the prevention of particle adhesion to reactor surfaces may be evaluated in a simple laboratory test. A sample of a polymer slurry produced by a dispersion polymerisation reaction carried out in the absence of surface-active agents is subjected to highshear stirring. Static electricity is thereby generated, and the polymer particles adhere to the stirrer and the vessel walls. A solution of the surface active agent under test is then added dropwise to the mixture with gentle stirring, and the volume of addition required to clear the surfaces and regenerate the smooth dispersion is measured. It should be noted however, that the concentration of surface-active agent required to regenerate the dispersion in this test is not necessarily the same as that required to prevent adhesion of polymer during an actual polymerisation reaction, since, as previously stated, generation of static electricity may be only one cause of particle adhesion. The concentration necessary in a polymerisation reaction may, however, be readily determined by trial in an experimental polymerisation reactor or pilot plant.

The invention is further illustrated by the following Examples.

EXAMPLES 1–10

Measurement of relative efficiency of surface-active agents

High density polyethylene powder (20 g), prepared in a system free of surface-active agents, was slurried in dry hexane (300 ml) in a 500 ml beaker. The slurry was subjected to high shear by a type A5101 Greaves mixer operating at 9000 rpm. After 15 minutes considerable quantities of polymer were found to adhere to the stirrer and to the beaker walls. A solution of 10 ppm by weight of surface-active agent in hexane or toluene was then added dropwise from a burette while the mixture was stirred gently, until the slurry was completely reconstituted. Further high shear stirring did not then cause adhesion of polymer to stirrer or walls. Results are given in Table I, together with two comparative experiments in which a known antifouling agent (Experiment C1) and toluene (Experiment C2) alone were added. The known antifouling agent of Experiment C1 was a mixture of a chromium tris(alkyl salicylate) containing $C_{14}$–$C_{18}$ alkyl groups, calcium dioctylsulphosuccinate and a polymeric nitrogen-containing compound, sold under the trade name "ASA3" by Shell Chemical Co. Ltd.

| Example No. | Surface Active Agent | Solvent | volume of 10 ppm soln added (ml) | conc ppm |
|---|---|---|---|---|
| 1 | $C_{10}F_{19}O(CH_2CH_2O)_{13}C_{10}F_{19}$ | hexane | 2.05 | 0.07 |
| 2 | $C_{10}F_{19}O(CH_2CH_2O)_{23}C_{10}F_{19}$ | " | 4.35 | 0.15 |
| 3 | $C_{10}F_{19}O(CH_2CH_2O)_{34}C_{10}F_{19}$ | " | 6.55 | 0.22 |
| 4 | $C_{10}F_{19}O(CH_2CH_2O)_{90}C_{10}F_{19}$ | toluene | 5.90 | 0.20 |
| 5 | $C_{10}F_{19}OC_6H_4COOH$ | hexane | 4.25 | 0.14 |
| 6 | $C_6F_{13}CH_2COOH$ | " | 3.3 | 0.11 |
| 7 | $C_{10}F_{19}O(CH_2CH_2O)_9C_{16}H_{33}$ | " | 8.95 | 0.30 |
| 8 Comparative | $C_{10}F_{19}OC_6H_4C_9H_{19}$ | | 22 | 0.7 |

| Example No. | Surface Active Agent | Solvent | volume of 10 ppm soln added (ml) | conc ppm |
|---|---|---|---|---|
| Examples | | | | |
| C1 | ASA3 | hexane | 8.5 | 0.28 |
| C2 | | toluene | — | 25 | — |

It will be seen that the most effective surface active agent tested was that in Example 1; however it may be commercially advantageous to use a larger quantity of a less effective but cheaper material. The cost of such materials on a weight basis is lower the more hydrocarbon units there are in the molecule.

Surface active agents with two terminal perfluorocarbon groups are seen to be more effective than those with one perfluorocarbon end group and one hydrocarbon end group. However, it may be preferred to use a compound having a perfluorocarbon group at one end and a hydrocarbon group at the other because of the greater solubility of such compounds in hydrocarbon diluents. The majority of the fluorine-containing surface active agents tested are significantly more active than "ASA3".

EXAMPLES 9 and 10 — Polymerisation Reactions

General Procedure pressure reached

The polymerisation of ethylene was carried out in a 1 US gallon stainless steel pressure vessel which was dried under vacuum then held at 60° C and charged with hexane (2 liters) purified by passage through molecular sieve and BTS deoxygenation catalyst. Surface active agent (if used) was added, and the reactor was sparged with ~200 liters of pure ethylene over 30 mins to remove any residual water and oxygen.

The catalyst was then injected as a slurry in hexane, and the vessel was sealed and pressurised with 300 1/hr ethylene plus 100 1/hr hydrogen until the pressurereached 250 psig. At this point the reactor contents were stirred at 1000 rpm and polymerisation allowed to proceed for 3 hours at 80°. Pressure was maintained at 250 psig excess gases being vented through a pressure control valve to a gas meter.

After 3 hours, the gas flow was stopped, the reactor cooled and vented and the polymer was recovered by filtration, dried and weighed. The melt flow index (MFI) of the product polymer was measured.

Comparative Experiment C3

The catalyst was zirconium tetrabenzyl (0.1 m Atom Zr) supported on grade B alumina previously dried at 500° C for 2 hours. The loading on the support was 0.8 m mole/g $Al_2O_3$. Polymerisation in the absence of surface active agent gave 906 g polymer of MFI 3.2. The polymer adhered strongly to the reactor walls and stirrer blades.

EXAMPLE 9

Polymerisation as in C3 above but in the presence of 5 ppm (based on the hexane diluent) of $C_{10}F_{19}O(CH_2CH_2O)_{13}C_{10}F_{19}$ gave 903 g polymer of MFI 5.1 with no fouling of the reactor. The weight of product indicated no loss of catalyst activity.

Comparative Experiment C4

The catalyst was as described in C3 above, but loaded at 0.9 m mole/g $Al_2O_3$. Polymerisation without surface active agent gave 685 g polymer of MFI 0.05 with severe fouling.

EXAMPLE 10

Experiment C4 was repeated in the presence of 2 ppm (based on diluent) of $C_{10}F_{19}O(CH_2CH_2O)_{34}C_{10}F_{19}$. The product weighed 770 g. and had MFI 0.06. No fouling was observed.

Comparative Experiment C5

Ethylene was copolymerised with butene-1 using the general procedure described above, but butene-1 being added to the reactor as a liquid by means of a pump at a rate equivalent to 50 ml of liquid butene-1 per hour. The catalyst used was 0.2 m Atom Zr added as zirconium tetrabenzyl supported on Grade B alumina.

Polymerisation was carried out for 2 hours at 80° C and a total pressure of 105 pressure of 105 psig and yielded 350 g of an ethylene/butene-1 copolymer containing 1.66 mole % of butene-1 and having an MFI of 32.5. However, the polymer adhered strongly to the vessel walls and stirrer blades.

EXAMPLE 11

The procedure of Experiment C5 was repeated in the presence of 10 ppm (based on diluent) of $C_{10}F_{19}O(CH_2CH_2O)_9C_{16}H_{33}$. A similar copolymer product in equivalent yield was obtained; but there was no fouling of the vessel or stirrer.

What we claim is:

1. A process for the polymerization or copolymerization of olefins by dispersion polymerization of the said olefin or olefins in a non-polar liquid hydrocarbon diluent in the presence of a polymerization catalyst which comprises a transition metal composition which is the product of reacting a transition metal complex of general formula $R_mMX_p$ with a substantially inert material having a hydroxylic surface which is free of adsorbed water, wherein M is a metal of Groups IVA to VIA of the Periodic Table, R is a hydrocarbon or substituted hydrocarbon group, X is a monovalent ligand and m and p are integers, m having a value from 2 to the highest valency of the metal M, and p having a value from 0, to 2 less than the prevailing valency of M in the complex, and in the presence of a surface-active compound containing one or more terminal aliphatic perfluoro carbon groups containing at least three carbon atoms, selected from branched and straight chain perfluoro alkyl and perfluoro alkenyl groups and perfluoro alkyl chains, and one or more hydrophilic groups selected from oxyalkylene chains and carboxyl groups, the surface-active compound being present in a concentration in the range 0.05 to 25 ppm based on the volume of hydrocarbon diluent.

2. A process according to claim 1 in which the surface active compound is a compound of general formula $R_fO(CH_2CH_2O)_xR$ or $R_fO(CH_2CH_2O)_xR_f$ where R is hydrogen or an alkyl group, $R_f$ is $C_nF_{2n+1}$ or $C_nF_{2n-1}$, where $n$ is 6, 8, 10 or 12, $x$ is an integer from 1 to 100.

3. A process according to claim 2 in which $R_f$ represents $C_{10}F_{19}$ and X is an integer from 5 to 40.

4. A process according to claim 1 in which the transition metal complex is zirconium tetrabenzyl and the inert material is alumina.

5. A process according to claim 1 in which ethylene is homopolymerised or is copolymerised with an α-olefin.

6. A process according to claim 5 in which the α-olefin is propene, butene-1 or hexene-1.

7. A process according to claim 1 in which the nonpolar diluent is pentane, hexane, heptane octane, or mixtures thereof, cyclohexane or an aromatic hydrocarbon.

* * * * *